(12) United States Patent
Landon

(10) Patent No.: US 9,657,854 B2
(45) Date of Patent: May 23, 2017

(54) SLIDING SKIRT VALVE

(71) Applicant: Green Drain Inc., Naples, FL (US)

(72) Inventor: Frank Landon, Santa Ana, CA (US)

(73) Assignee: GREEN DRAIN, INC., Naples, FL (US)

( * ) Notice: Subject to any disclaimer, the term of this patent is extended or adjusted under 35 U.S.C. 154(b) by 0 days.

(21) Appl. No.: 15/009,072

(22) Filed: Jan. 28, 2016

(65) Prior Publication Data

US 2016/0215895 A1 Jul. 28, 2016

Related U.S. Application Data

(60) Provisional application No. 62/108,925, filed on Jan. 28, 2015.

(51) Int. Cl.
*F16K 15/02* (2006.01)
*F16K 15/14* (2006.01)

(52) U.S. Cl.
CPC ............ *F16K 15/02* (2013.01); *F16K 15/144* (2013.01)

(58) Field of Classification Search
CPC ......... Y10T 137/3149; Y10T 137/3185; Y10T 137/3222; Y10T 137/3258; Y10T 137/3294; Y10T 137/3331; Y10T 137/2617; Y10T 137/2622; Y10T 137/2627; Y10T 137/3021; Y10T 137/3087; Y10T 137/87322; Y10T 137/87555; Y10T 137/87539; Y10T 137/87563; Y10T 137/87378; Y10T 137/87394; Y10T 137/784; Y10T 137/7841; Y10T 137/7842; Y10T 137/7847; Y10T 137/7849; Y10T 137/7891; Y10T 137/7884; Y10T 137/7886; E03F 5/042; E03D 11/10; E03D 13/00; F16K 21/04; F16K 15/148; F16K 15/02; F16K 15/144

See application file for complete search history.

(56) References Cited

U.S. PATENT DOCUMENTS

| | | | |
|---|---|---|---|
| 1,137,516 A | 4/1915 | Moon | |
| 3,007,484 A * | 11/1961 | Hallinan | E03F 5/042 137/410 |
| 4,180,875 A * | 1/1980 | Wilson | E03D 9/032 4/224 |
| 4,762,149 A | 8/1988 | Pickl, Jr. | |

(Continued)

FOREIGN PATENT DOCUMENTS

JP 2007211470 8/2007

*Primary Examiner* — Craig Schneider
*Assistant Examiner* — Frederick D Soski
(74) *Attorney, Agent, or Firm* — Fish & Tsang

(57) ABSTRACT

Sliding skirt valves for waterless urinals and method of controlling fluid flow through the sliding skirt valve are presented. The sliding skirt valve has a valve body, which includes an inlet, an outlet and a sealing surface. The sliding skirt valve also has a central shaft with an upper stop and a lower stop and a barrier interface. Between the upper and the lower stops, a conical barrier is slidingly engaged with the barrier interface. In a normal pressure state, the conical barrier lies against the lower stop of the central shaft. In a back pressure state, the conical barrier moves upwardly to lie against the upper stop of the central shaft and block the vent to upward fluid flow from the downstream of the sliding skirt valve.

17 Claims, 4 Drawing Sheets

(56) References Cited

U.S. PATENT DOCUMENTS

| | | | |
|---|---|---|---|
| 4,796,665 A | | 1/1989 | Christiany |
| 6,073,275 A | | 6/2000 | Klopocinski |
| 6,626,201 B1 | * | 9/2003 | Kim .................. E03F 5/042 137/1 |
| 7,140,388 B2 | | 11/2006 | Chalich |
| 7,887,697 B2 | | 2/2011 | Worth |
| 9,027,172 B2 | * | 5/2015 | Fima .................. E03D 13/007 4/287 |
| 2008/0295233 A1 | * | 12/2008 | Fima .................. E03D 5/105 4/144.1 |
| 2010/0192295 A1 | * | 8/2010 | Fima .................. E03C 1/298 4/679 |
| 2011/0010833 A1 | * | 1/2011 | Fima .................. C02F 1/325 4/301 |
| 2011/0203048 A1 | * | 8/2011 | Fima .................. E03C 1/281 4/679 |
| 2012/0199215 A1 | | 8/2012 | Cohen |
| 2014/0166560 A1 | | 6/2014 | Cohen et al. |
| 2014/0201904 A1 | | 7/2014 | Sapara, Jr. |
| 2015/0013064 A1 | | 1/2015 | Marty et al. |

* cited by examiner

SLIDING SKIRT VALVE

This application claims priority to our U.S. provisional patent application with the Ser. No. 62/108,925 filed Jan. 28, 2015 which is incorporated by reference herein in its entirety.

FIELD OF THE INVENTION

The field of the invention is fluid control valves, particularly valves utilized in a waterless urinal.

BACKGROUND

The background description includes information that may be useful in understanding the present invention. It is not an admission that any of the information provided herein is prior art or relevant to the presently claimed invention, or that any publication specifically or implicitly referenced is prior art.

A P trap is a common feature of plumbing fixtures and is essentially a device that maintains a body of water between sewer gases and the exterior of the fixture. Although they have been in use for some time, a P trap can still suffers from a number of disadvantages. For example, in the absence of an evaporation barrier liquids held within the P trap will evaporate over time. Once the water in the P trap has evaporated the plumbing fixture is able to vent unpleasant odors and dangerous gases directly from the sewage system. Typical evaporation barriers include the provision of a layer of low density, insoluble oil, however over time this oil is lost and must be replaced. Other alternatives include the use of highly flexible covers that deform readily to permit the passage of water through the fixture. Over time, however, the materials from which these valves are constructed become stiff, which can deform that valve and render it ineffective. Such covers and valves can also protrude, which limits their utility with floor drains.

In addition, P traps are not always successful in prevent pests from moving up a sewer line and exiting from a plumbing fixture. Some insect pests, notably cockroaches, are able to traverse the water barrier of a P trap and reach the associated plumbing fixture. Since such fixtures can be found in bathrooms, food preparation areas, and other areas where cleanliness is very important this is clearly undesirable. A layer of oil, such as is commonly used in conventional waterless urinals, does not prevent these pests from exiting the drain.

Some have sought to solve the problem by providing exhaustion system for a toilet. For example, U.S. Pat. No. 6,073,275 to Klopocinski discloses an odor exhaust system which withdraws gases from the toilet bowl and delivers them to the sewage drain downstream of the toilet water trap. In Klopocinski, an order extraction trap and valve is connected to the exhaust trap, and the valve is moved to an open position when the exhaust fan is operating, and the valve is closed when the exhaust valve is turned off. However, the valve movement is coupled with the operation of motorized fan, which is operated manually by the user.

Others have sought to solve the problem by providing an air vent valve that can change its position upon the air pressure. For example, U.S. Pat. No. 7,140,388 to Chalich discloses a dual ball valve air vent valve. In this system, two balls are sitting on an O-ring sealing gaskets. When the air pressure in the conduit changes, the two balls can float to provide a venting space between the balls and the sealing gaskets.

Others have sought to solve the problem by providing multiple sealing seats for a valve. For example, U.S. Pat. No. 4,796,665 to Christiany discloses a valve body with multiple sealing seats. In Christiany, a valve element changes its position between the multiple sealing seats to control flows through the valve body. However, Christiany's valve element changes positions in response to the amount of downward fluid flow, not to the upward gaseous flow from the sewage system.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for a mechanism that can provide a stable, low maintenance barrier to evaporation from such traps, and also for a simple and reliable trap that can be easily added to existing fixtures.

SUMMARY OF THE INVENTION

The inventive subject matter provides apparatus, systems and methods in which a sliding skirt valve mechanism is supplied that provides for the passage of liquids through a drain while reducing evaporation of water from a P trap or other fluid barrier downstream from the drain.

One aspect of the invention includes a device for controlling fluid flow, preferably in a waterless urinal. The device includes a valve body having an inlet, an outlet, and a sealing surface, a central shaft, and a conical barrier. The central shaft having an upper stop and lower stop is positioned within the valve body. The upper stop of the central shaft is positioned below the inlet of the valve body, and the lower stop is positioned below the upper stop. The central shaft also has a barrier interface, which is located between the upper and lower stops.

In a preferred embodiment, the conical barrier of the device is configured as the surface of a frustum of a cone and arranged with the small base oriented towards the inlet. The conical barrier includes an aperture at the small base. The central shaft is configured to pass through the aperture of the conical barrier at the barrier interface so that the conical barrier is slidingly engaged with the central shaft at the barrier interface. Thus, the conical barrier can move between the lower stop and the upper stop of the central shaft.

One aspect of the invention includes method for controlling fluid flow, preferably in a waterless urinal. The method includes step of providing a sliding skirt valve that includes a valve body having an inlet, an outlet, and a sealing surface, a central shaft, and a conical barrier and directing a flow of fluid through the sliding skirt valve. The central shaft having an upper stop and lower stop is positioned within the valve body. The upper stop of the central shaft is positioned below the inlet of the valve body, and the lower stop is positioned below the upper stop. The central shaft also has a barrier interface, which is located between the upper and lower stops.

In a preferred embodiment, the conical barrier of the device is configured as the surface of a frustum of a cone and arranged with the small base oriented towards the inlet. The conical barrier includes an aperture at the small base. The central shaft is configured to pass through the aperture of the conical barrier at the barrier interface so that the conical barrier is slidingly engaged with the central shaft at the barrier interface, which allows the conical barrier to move between the lower stop and the upper stop of the central shaft. Thus, in this method, when the sliding skirt valve has a normal pressure state, the sliding skirt valve allows the flow of fluid from the inlet to the outlet. When the sliding skirt valve has a back pressure state, the sliding skirt valve prevents the flow of fluid from the outlet to the inlet Various objects, features, aspects and advantages of the inventive subject matter will become more apparent from the following detailed description of preferred embodiments, along with the accompanying drawing figures in which like numerals represent like components.

DETAILED DESCRIPTION

Figure 1A:
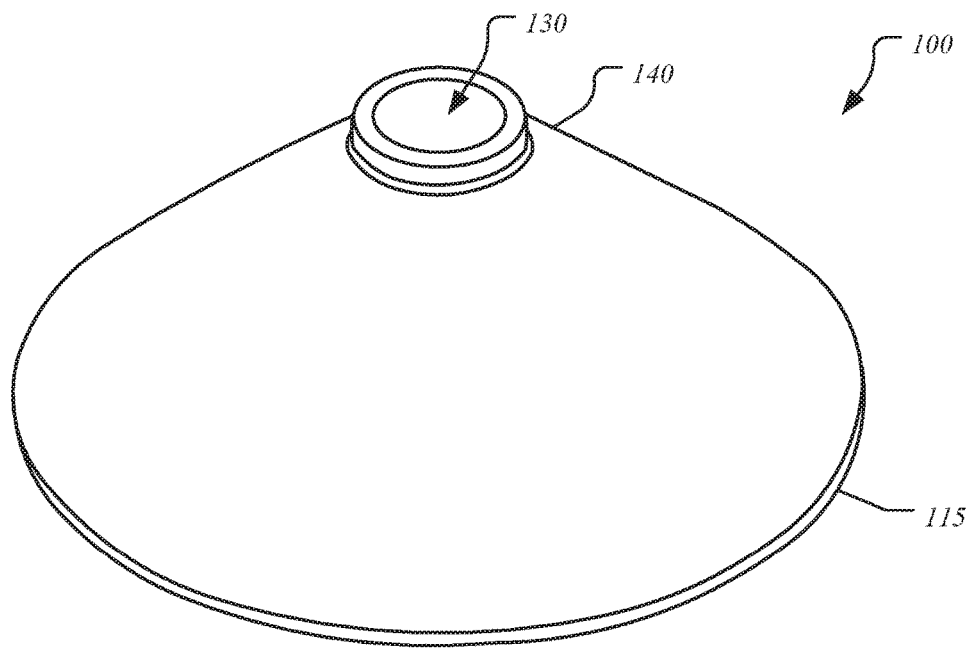
FIG. 1A is a perspective view of one embodiment of sliding skirt valve.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Further, the terms "coupled to" and "coupled with" are used euphemistically in a networking context to mean "communicatively coupled with" where two or more devices are configured to exchange data (e.g., uni-directionally, bi-directionally, peer-to-peer, etc.) with each other possibly via one or more intermediary devices.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

In some embodiments, the numbers expressing quantities of properties such as dimensions used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The present invention provides systems, devices, and methods of controlling fluid flow, preferably in a waterless urinal. One aspect of the inventive subject matter includes a device for controlling fluid flow. The device includes a valve body, a central shaft, and a conical barrier.

Figure 1B:
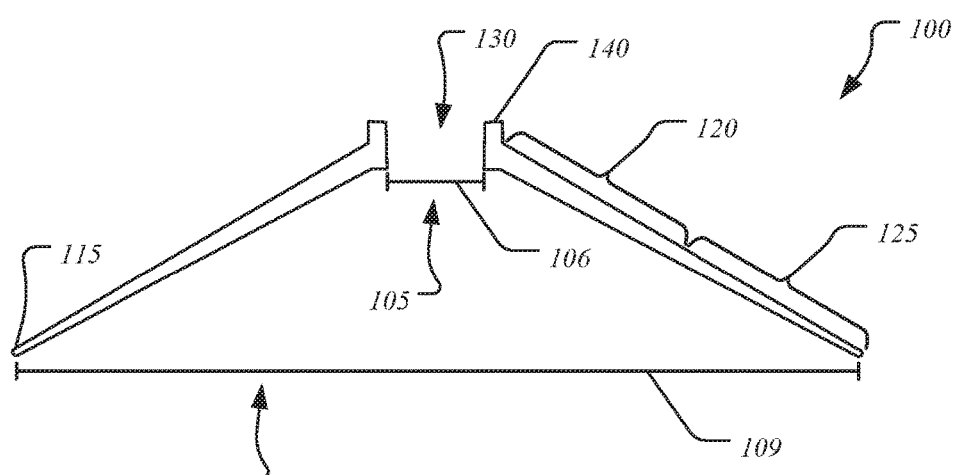
FIG. 1B is a cross-sectional view of the sliding skirt valve of FIG. 1A

FIGS. 1A-B shows a perspective view and a vertical cross-sectional view of one embodiment of the conical barrier 100, respectively. As shown in FIGS. 1A-B, the conical barrier 100 can be shaped as a frustum of a cone having an upper base 105 and a lower base 110. Generally, the size (e.g., diameter) 106 of the upper base 105 is smaller than the size (e.g., diameter) 109 of the lower base 110.

In a preferred embodiment, the conical barrier 100 has a varying thickness along its respective radius, such that the conical barrier 100 is sufficiently thin at the outer edge portion 115 to allow even small amounts of urine or wastewater to pass through the conical barrier 100, while retaining sufficient strength for durability at the inner core portion 120. Thus, in this embodiment, the average thickness of the inner core portion 120 is larger than the average thickness of the outer edge portion 125. As used herein, the inner core portion 120 comprises an area of the conical barrier 100 circumscribed about a half of the length of the conical barrier 100. The outer edge portion comprises an area of the conical barrier 100 circumscribed about another half of the length of the conical barrier 100.

In some other embodiments, the conical barrier 100 can have a pliancy that changes along its axis. For example, the conical barrier 100 has increased pliancy towards the outer edge 115 with or without changing the thickness along its axis.

The conical barrier 100 can comprise a flexible, synthetic membrane that can comprise any commercially suitable material(s). In a preferred embodiment, the conical barrier 100 is constructed of a material that is resistant to decomposition, oxidation, and/or biological activity. For example, suitable materials include urine resistant rubber, silicone, nitrile rubber, polyethylene, a perfluoro elastomer, an ethylene acrylate elastomer, and polychloroprene, or combinations thereof, which provide protection to the conical barrier 100 from significant damage or degradation by urine fluids and cleaning solvents. The conical barrier 100 thereby advantageously allows urine to pass through to the drain line without allowing odors to permeate up from the drain line.

The conical barrier 100 has an aperture 130 located centrally in the smaller upper base 140, which is used in mounting the conical barrier 100 in a shaft as described below. The size (e.g., diameter, height, etc.) of the aperture 130 can vary depending on the shaft that assembles with the conical barrier 100. In some embodiments, the size of the aperture is at least 1 cm, preferably at least 2 cm, more preferably at least 3 cm.

Figure 2A:
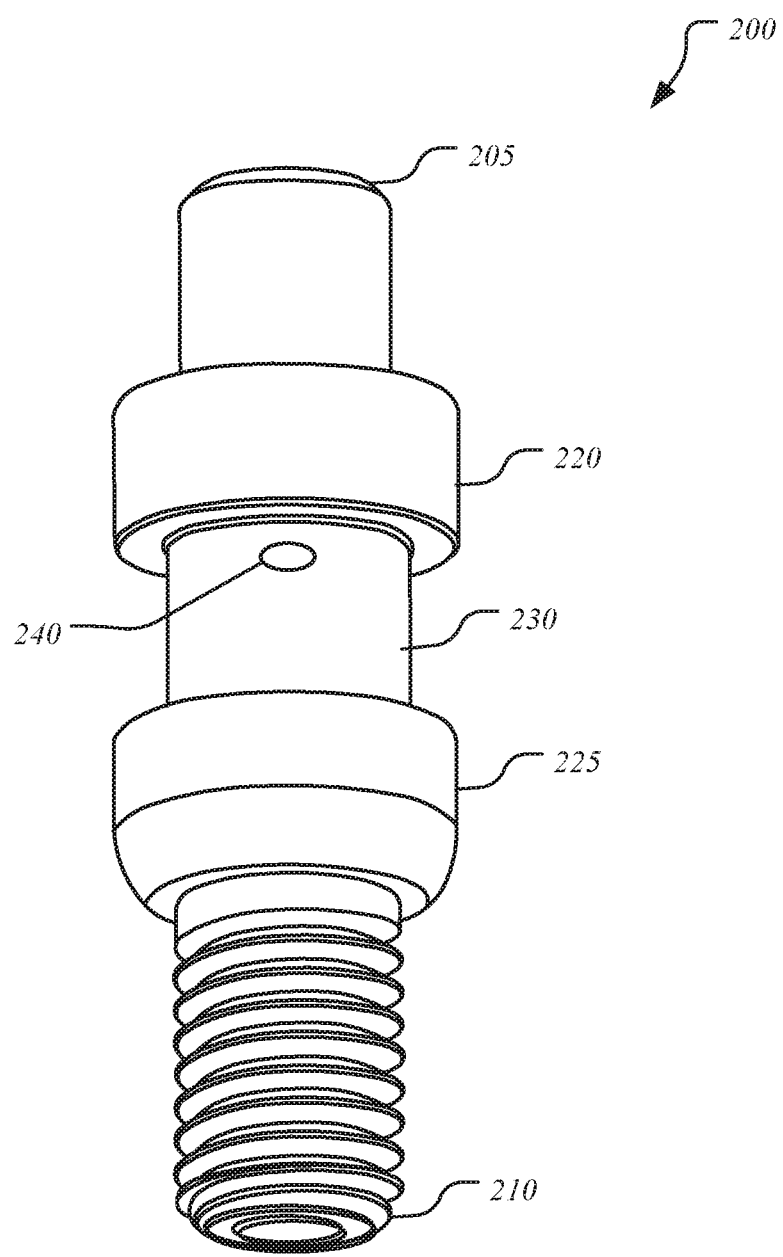
FIG. 2A is a perspective view of one embodiment of a central shaft.
Figure 2B:
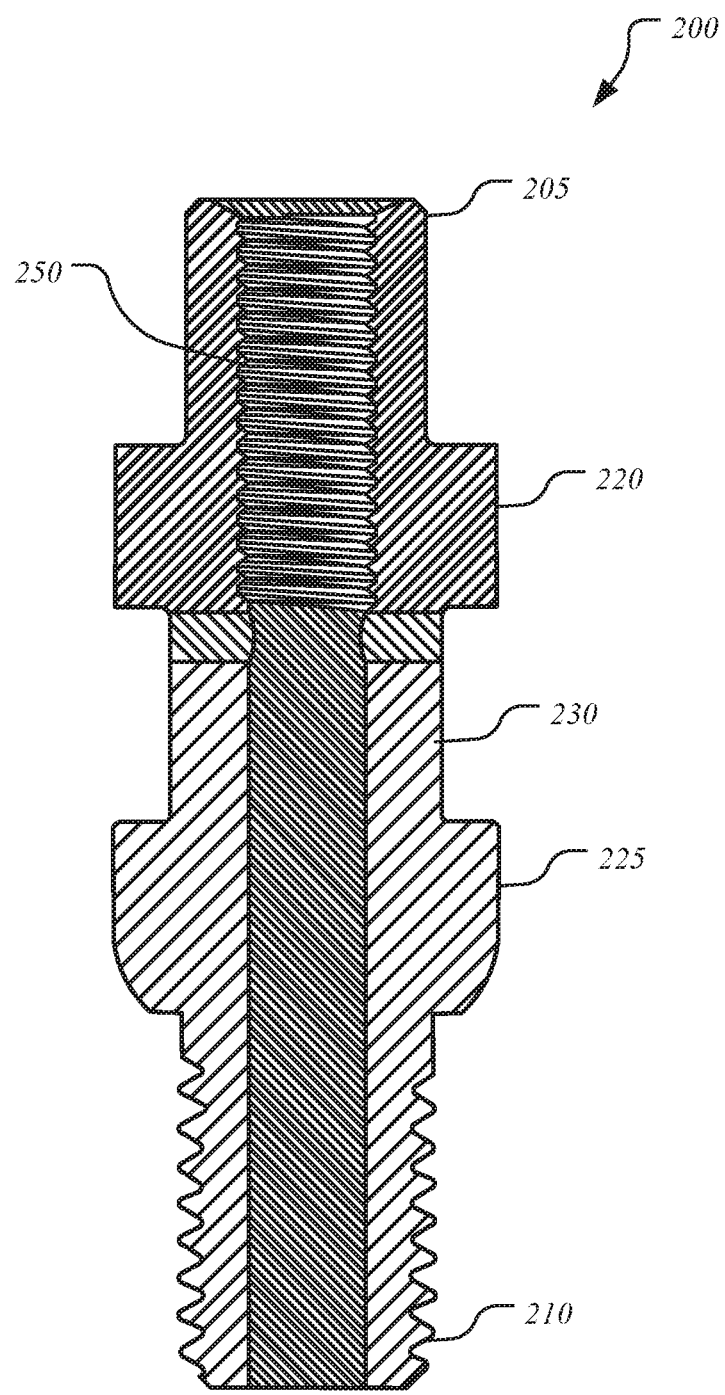
FIG. 2B is a cross-sectional view of the central shaft of FIG. 2A.

FIGS. 2A-B shows a perspective view and a vertical cross-sectional view of one embodiment of a central shaft 200. The central shaft 200 has an upper terminus 205 and a lower terminus 210. Generally, the upper terminus 205 is located on the upstream of the fluid flow, and the lower terminus 210 is located on downstream of the fluid flow, lower than the upper terminus 205. The central shaft 200 also has an upper stop 220, a lower stop 225, and a barrier interface 230 is located between the upper stop 220 and the lower stop 225.

The barrier interface 230 is configured to be coupled with an inner surface of the small upper base 140 of the conical barrier 100 slidably such that the conical barrier 100 can move between the upper stop 220 and the lower stop 225 along the barrier interface 230. Thus, the aperture 130 of the conical barrier 100 surrounds the barrier interface 230 of the central shaft 200. In a preferred embodiment, at least a portion of the upper stop 220 and the lower stop 225 is protruded relative to the barrier interface 230 such that movement of the conical barrier 100 can be hindered when at least a portion of the inner surface of the small upper base 140 contacts the upper stop 220 or the lower stop 225.

In some embodiments, at least a portion of the central shaft 200 between the lower stop 225 and the lower terminus 210 is threaded such that the central shaft 200 can be coupled with other devices (e.g., another shaft, an extension part, etc.) via the threaded portion from the lower terminus 210.

In some embodiments, as shown in FIG. 2B, the central shaft 200 includes a lumen 250. The lumen 250 can be a full lumen that traverses the entire central shaft 200 or a partial lumen that occurs over a portion of the central shaft 200. As used herein, a lumen is an inside space of a structure. In some embodiments, the shape of the lumen depends on the shape of the conduit. For example, the conduit can a tubular shape, a twisted tubular shape, a cuboid shape, or a triangular prism shape, and the shape of the lumen can be shaped to match the central shaft 200. In other embodiments, the shape of the lumen can be independent from the shape of the central shaft 200. For example, where a central shaft 200 has tubular shape, the lumen could have a cuboid shape, or vice versa.

In a preferred embodiment, where the lumen 250 is a full lumen that traverses the entire central shaft 200, it is contemplated that at least a portion of the lumen 250 proximal to the upper terminus 205 can be threaded. For example, in this embodiment, the portion of the lumen between upper end of the barrier interface 230 and the upper terminus 205 can be threaded such that the central shaft 200 can be coupled with other devices (e.g., another shaft, an extension part, a blocking device, etc.) via the threaded portion from the upper terminus 205.

The central shaft 200 also can include a vent 240 that connects the lumen 250 of the central shaft 200 to the exterior surface of the central shaft 200. The vent 240 can be located within the barrier interface 230. The vent 240 is configured to release fluid (e.g., a liquid fluid, a gas fluid, etc.) from the lumen 250 of the central shaft 200 to outside of the central shaft 200. For example, the fluid can be a gas originating from the sewer that travels upward to the lumen 250 of the central shaft 200.

Any suitable materials can be used to build the central shaft 200. In some embodiments, the central shaft is constructed of a chemically resistant and/or low friction material. Suitable materials include polypropylene, fluoropolymers, stainless steel, and combinations thereof.

Figure 3A:
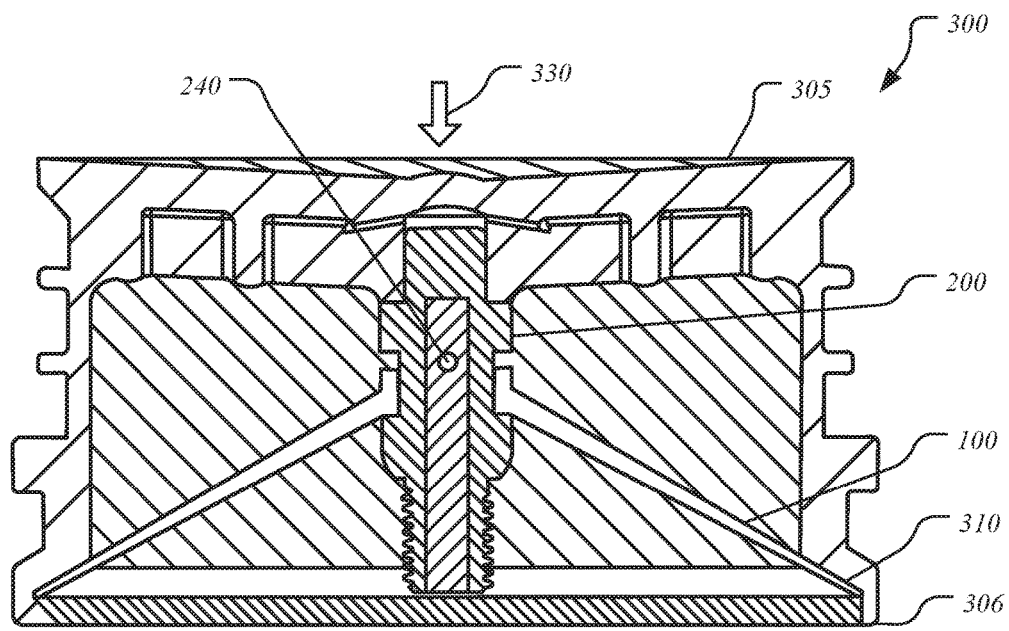
FIG. 3A is a cross-sectional view of the sliding skirt valve assembled with the central shaft under a normal pressure.
Figure 3B:
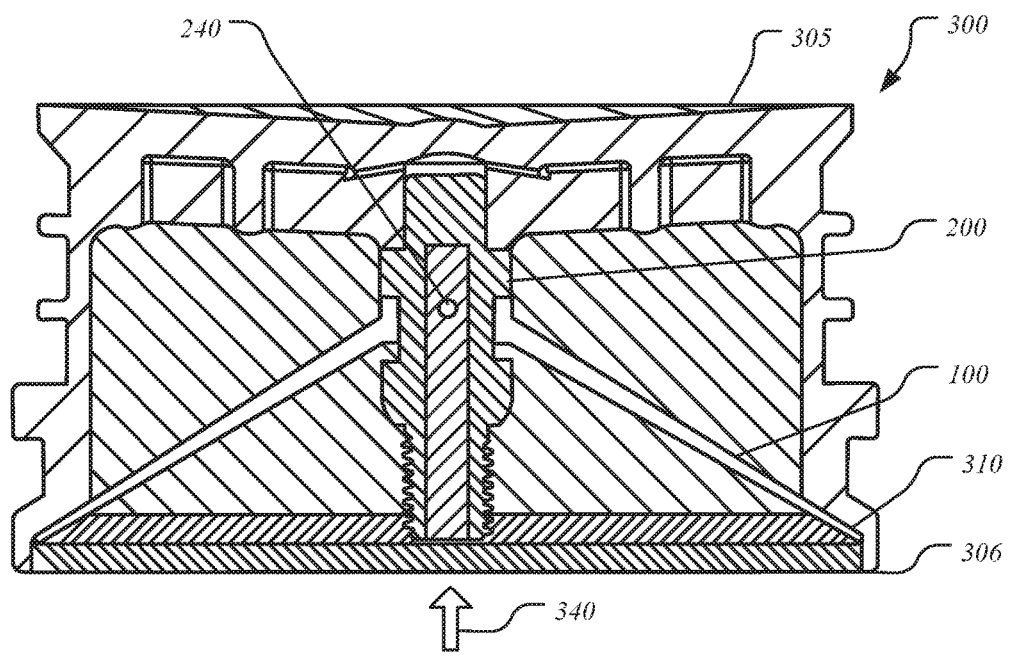
FIG. 3B a cross-sectional view of the sliding skirt valve assembled with the central shaft with a back pressure.

FIGS. 3A-B show a valve body that has an inlet 305, an outlet 306, and a sealing surface 310. The inlet 305 is located upstream of the fluid flow through the device and the outlet 306 is located downstream of the fluid flow relative to the inlet. The sealing surface 310 is located between the inlet 305 and the outlet 306. In a preferred embodiment, the sealing surface 301 is downwardly facing such that a portion of the outer edge portion 125 of the conical barrier 100 can sit below the sealing surface 301. Because the portion of the outer edge portion 125 of the conical barrier 100 is flexible enough to bend further downwardly upon the pressure of the fluid flowing from the upstream of the inlet 305, the fluid can pass through between the outer edge portion 125 and the sealing surface 301 toward the outlet 306. Thus, the fluid flows through a passageway that is defined by the inlet 305, the conical barrier 100 and the outlet 306.

The conical barrier 100 is slidingly mounted between the upper stop 220 and the lower stop 225 of the central shaft 220 along the barrier interface 230, and can move upwardly and downwardly along the barrier interface 230 by pressure upon the conical barrier 200 and/or pressure from the lumen 250 through the vent 240. In a normal pressure state, as shown in FIG. 3A, where a downward pressure (shown as arrow 330) from the inlet 305 upon the conical barrier 100 is substantially larger than an upward pressure (shown as arrow 340) from the outlet 306 upon the conical barrier, the aperture 130 of the conical barrier 100 lies against the lower stop 225 of the central shaft 220 such that the conical barrier 100 does not block the vent 340 of the central shaft 200. This permits pressure equalization across both sides of the conical barrier 100.

In a backpressure state, as shown in FIG. 3B, where a downward pressure (shown as arrow 330) from the inlet 305 upon the conical barrier 100 is substantially equal or smaller than an upward pressure (shown as arrow 340) from the outlet 306, the conical barrier 100 can deform to extend upwardly so that the aperture 130 rests against the upper stop 220 of the central shaft 220. In this state the conical barrier 100 blocks the vent 340, preventing pressure equalization and preventing fluids (i.e. gas or liquid) from moving through the sliding skirt valve. As pressure state changes from the back pressure state to the normal pressure state, the conical barrier 100 can descend to rest on the lower stop 225 of the central shaft 220.

Although it is illustrated in FIG. 3A that a portion of the edge portion 125 of the conical barrier 100 contacts the sealing surface 310 during the normal pressure state, it should be appreciated that, in some embodiments, the lower stop 225 can be positioned to provide a gap between the upper surface of the conical barrier 100 and the sealing surface 310. In these embodiments, it is contemplated that the gap between the conical barrier 100 and the sealing surface 310 is closed when the sliding skirt valve is in a back pressure state. It should also be appreciated that unconventional sources of back pressure, for example pest species attempting to traverse the drain from the sewer system, will move the conical barrier to the back pressure position and block their passage through the gap between the conical barrier 100 and the sealing surface or through the vent 240.

In some embodiments the sliding skirt valve can include secondary features, for example nuts, gaskets, baskets, bags, nets, and other porous enclosures for securing items at or in proximity to the sliding skirt valve. In such embodiments, threads provided on the central shaft can serve as a method of attachment. In some embodiments a chemical disk (for example a deodorizer) can be secured to the central shaft, for example by placement in an attached porous enclosure or by passing a threaded portion of the central shaft through an aperture in the chemical disk and securing the chemical disk with a nut or gasket that engages the threads. Alternatively, a mesh, filter, porous plate, or other solid/particle retaining device can be secured to the upper portion of the sliding skirt valve via internal threading of the central shaft in order to prevent or reduce fouling of the valve mechanism.

Another aspect of the invention includes a method of controlling fluid flow, preferably at a waterless urinal using a sliding skirt valve described in FIGS. 1-3. In a preferred method, a user directs a flow of fluid (e.g., liquid fluid, gas fluid, etc.) through the sliding skirt valve installed in a urinal structure, preferably in a waterless urinal. In a normal pressure state, the sliding skirt valve allows the flow of fluid from the inlet to outlet while not blocking the vent of the central shaft. In a back pressure state, the sliding skirt valve blocks the vent of the central shaft such that the flow of fluid from the outlet to the inlet can be prevented.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A device for controlling fluid flow, comprising:
   a valve body comprising an inlet, an outlet, and a sealing surface;
   a central shaft that is positioned within the valve body comprising an upper stop that is positioned below the inlet, a lower stop that is positioned below the upper stop, and a barrier interface that lies between the upper stop and the lower stop;
   a conical barrier, configured as the surface of a frustum of a cone and small base oriented towards the inlet and comprising an aperture positioned at the small base, wherein the central shaft passes through the aperture at the barrier interface,
   wherein the conical barrier is slidably engaged with the central shaft at the barrier interface and is configured to move between the lower stop and the upper stop, and
   a vent positioned at the barrier interface, wherein the vent is blocked in a backpressure state and exposed in a normal pressure state.

2. The device of claim 1, wherein the inlet, conical barrier, and outlet define a passageway through which a liquid can flow through the device.

3. The device of claim 1, wherein the vent is blocked by the small base of the conical barrier when the small base slidably moves upwardly toward the vent.

4. The device of claim wherein the central shaft comprises a lumen, and at least a portion of a surface of the lumen is threaded.

5. The device of claim 1, wherein at least a portion of outer surface of the central shaft is threaded.

6. The device of claim 5, wherein the portion of outer surface that is threaded is located below the lower stop.

7. The device of claim 1, wherein the conical barrier is a skirt valve.

8. The device of claim 1, wherein the conical barrier has an inner portion and an outer portion, and the outer portion has greater flexibility than the inner portion.

9. The device of claim 1, wherein the inner portion has an average first thickness and the outer portion has an average second thickness, and the average first thickness is greater than the average second thickness.

10. A method for controlling fluid flow, comprising;
    providing a sliding skirt valve, the sliding skirt valve comprising
    (a) a valve body comprising an inlet, an outlet, and a sealing surface,
    (b) a central shaft that is positioned within the valve body comprising an upper stop that is positioned below the inlet, a lower stop that is positioned below the upper stop, and a barrier interface that lies between the upper stop and the lower stop,
    (c) a conical barrier, configured as the surface of a frustum of a cone and a small base oriented towards the inlet and comprising an aperture positioned at the small base, wherein the central shaft passes through the aperture at the barrier interface;
    (d) a vent that is positioned at the barrier interface, wherein the vent is blocked in a backpressure state and exposed in a normal pressure state; and
    directing a flow of fluid through the sliding skirt valve, wherein the sliding skirt valve has a normal pressure state that permits the flow of fluid from the inlet to the outlet and a back pressure state that prevents the flow of fluid from the outlet to the inlet.

11. The method of claim 10, wherein the flow of fluid passes through a waterless urinal.

12. The method of claim 10, wherein the aperture is in contact with the lower stop when the sliding skirt valve is in the normal pressure state.

13. The method of claim 10, wherein the aperture is in contact with the upper stop when the sliding skirt valve is in the back pressure state.

14. The method of claim 10, wherein the vent is blocked by the small base of the conical barrier when the small base slidably moves upwardly toward the vent.

15. The method of claim 10, wherein the sliding skirt valve deforms between the normal pressure state and the back pressure state, and the backpressure state is resulted from fluid flowing through the skirt valve from the outlet towards the inlet.

16. The method of claim 15, wherein the fluid is a liquid originating from a sewer.

17. The method of claim 15, wherein the fluid is a gas originating from a sewer.

\* \* \* \* \*